United States Patent [19]

McAllan et al.

[11] Patent Number: 4,976,039
[45] Date of Patent: Dec. 11, 1990

[54] NAVIGATION AID

[76] Inventors: John D. McAllan, 187 Maxwellton Avenue, East Kilbride, Glasgow G74 3DX; Douglas L. Young, 7 Ard Gare, Shandon, Nr. Helensburgh, Dunbartonshire, both of Scotland

[21] Appl. No.: 238,317

[22] Filed: Aug. 30, 1988

[51] Int. Cl.⁵ .................. G01B 11/26; G01C 1/00
[52] U.S. Cl. ........................... 33/285; 33/276; 33/286; 350/632; 356/142
[58] Field of Search ............ 33/285, 275 R, 276, 33/333, 286, 334, 352, 227, 228, 284; 350/574, 543; 356/148, 140, 152, 142, 253, 255

[56] References Cited

U.S. PATENT DOCUMENTS

| | | | |
|---|---|---|---|
| 621,283 | 3/1899 | Pulfrich | 350/543 |
| 869,395 | 10/1907 | Schleth | 350/543 |
| 3,167,864 | 2/1965 | Lange | 356/255 X |
| 3,300,861 | 1/1965 | Lilly | 356/255 X |
| 3,554,630 | 1/1971 | Rogers, Jr. | 356/255 X |
| 3,801,187 | 4/1974 | McMichael | 350/574 |
| 4,232,965 | 11/1980 | Sauerwein | 33/276 X |
| 4,480,390 | 11/1984 | Frissora et al. | 33/286 |

Primary Examiner—Daniel M. Yasich
Attorney, Agent, or Firm—Ratner & Prestia

[57] ABSTRACT

There is described a navigation aid for use in sailing vessels. The navigation aid comprising a casing having at least one side wall, the side wall having an aperture, and at least one end wall, the end wall also having an aperture. The casing encloses at least one reflective surface such as a mirror movably mounted on a linked frame in the form of an elongate member formed with two end sections, and a central section, the central section being formed to receive the reflective surface. Light entering the aid via the aperture in the side wall will be reflected off of the reflected surface through the aperture in the end wall. Thus an object positioned at the side of the casing can be viewed through the aperture in the end wall. The aperture in the side wall comprises a static marker which may be aligned with objects viewed through the aid for a range of pre-set angles, between the reflective surface and the central axis of the casing.

7 Claims, 9 Drawing Sheets

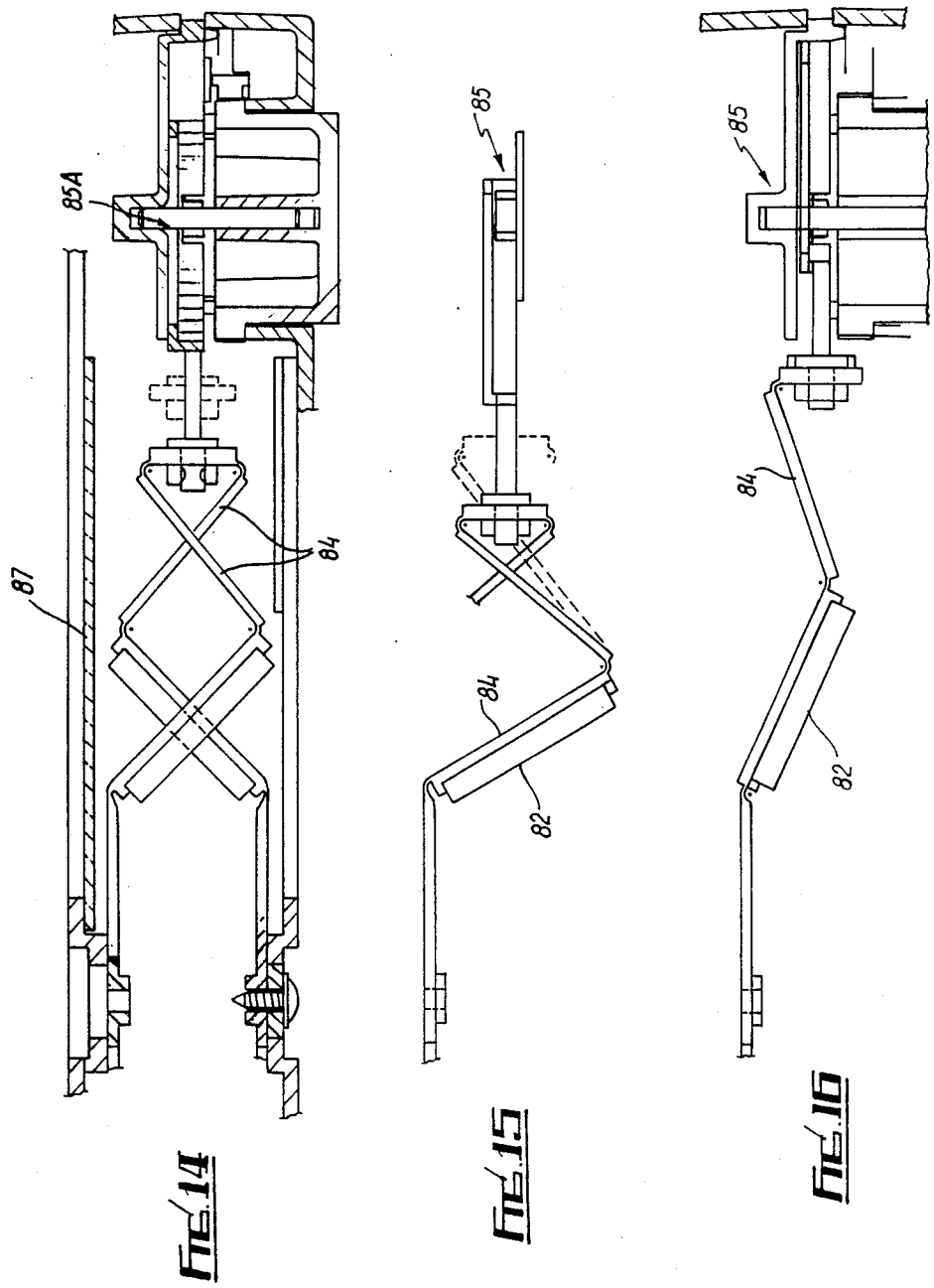

NAVIGATION AID

This invention relates to a navigation aid for use in sailing vessels.

BACKGROUND OF THE INVENTION

While tacking into the wind the navigator of a sailing vessel wishes to follow the course which will allow the fastest progress in the desired direction of travel.

The optimum tacking angle for the vessel is determined by a number of variables, including wind direction and speed, water conditions, number of crew and ballast being carried. Taking these variables into account a navigator can determine the tacking angle at which fastest progress will be made.

Once the optimum tacking angle has been determined the vessels course can be plotted on a chart for the helmsman to follow.

To follow the course accurately the helmsman must know when to change tack. This point can be found by monitoring the vessel's position relative to landmarks or buoys using compasses. However, the procedure involved in taking compass bearings and converting these from magnetic to grid bearings is time consuming and, therefore, occupies a crew member who is not then available for other tasks.

It is an object of this invention to obviate or mitigate these disadvantages.

SUMMARY OF THE INVENTION

According to the present invention there is provided a navigation aid for use in sailing vessels, the aid comprising a casing defined by at least one side wall and one end wall, the side wall having a first aperture and the end wall having a second aperture, a reflective surface mounted on a movable mechanism, the mechanism being capable of adjustment of the position of the reflective surface such than an object located within a range of angles to the central axis of the casing can be viewed due to light from the object being transmitted by the first aperture and reflected by the reflective surface at an angle of reflectance which will direct the light through the second aperture, the angle of reflectance being alterable by the user by altering the positioning of the reflective surface.

Preferably, the reflective surface is a mirror.

Alternatively, the reflective surface is a prism.

Preferably, the movable mechanism comprises an elongate member having three pivotally connected sections, the central section of the member being formed so as to receive the reflective suface, one end of the member being affixed to the casing near the end of the casing and the opposite end of the member being affixed to an arm at the opposite end of the casing, such that movement of the arm pivots the sections with respect to each other and thus alters the angle of the central section with respect to the central axis of the casing.

Alternatively, the movable mechanism comprises a platform which can rotate horizontally with respect to a line normal to the central axis of the casing.

Preferably, the first aperture includes a marker which can be viewed through the second aperture over a range of angles via reflection in the reflective surface such that distant objects can be viewed in alignment with the marker, at predetermined angles of the reflective surface.

Preferably, an indicator means is provided to indicate the angle of incidence subtended by a line drawn from the marker to the reflective surface and the surface, such that light which is incident along that line will be reflected through the second aperture.

Preferably, alignment means are provided on the casing, along the central axis thereof to enable the user to align the aid, and thus his line of sight, in a specific direction, such as the heading of a vessel on which he is travelling.

Further, according to the present invention there is provided a navigation aid, for use in sailing vessels, the aid comprising a casing defined by at least one side wall and one end wall, the side wall having a first aperture and the end wall having a second aperture, a reflective surface mounted on a movable mechanism, the mechanism comprising an elongate member having three pivotally connected sections, the central section of the member being formed so as to receive the reflective surface, one end of the member being affixed to the casing near the end of the casing and the opposite end of the member being affixed to an arm, at the opposite end of the casing, such that movement of the arm pivots the sections with respect to each other and thus alters the angle of the central section with respect to the central axis of the casing, thereby enabling adjustment of the position of the reflective surface, such that an object located within a range of angles to the central axis of the casing can be viewed due to light form the object from the light being transmitted by the first aperture and reflected by the reflective surface at an angle of reflectance which will direct the light through the second aperture, the angle of reflectance being alterable by the user altering the positioning of the reflective surface.

Preferably a third aperture is provided, said third aperture being located in the side wall opposite the first aperture, and including a second movable mechanism which includes a second reflective surface positioned so as to reflect light transmitted by the third aperture in the direction of the second aperture.

Preferably, the reflective surface is a mirror.

Preferably, the reflective surface is a prism.

Preferably, the first aperture includes a marker which can be viewed through the second aperture over a range of angles such that distant objects can be viewed in alignment with the marker, at predetermined angles of the reflective surface.

Preferably, an indicator means is provided to indicate angle of incidence subtended by a line drawn from the marker to the reflective surface and the surface, such that light which is incident along that line will be reflected through the second aperture.

Preferably, alignment means are provided on the casing, along the central axis of the casing to enable the user to align the aid, and thus his line of sight in a specific direction, such as the heading of a vessel on which he is travelling.

BRIEF DESCRIPTION OF THE DRAWINGS

Embodiments of the present invention will now be described, by way of example, with reference to the accompanying drawings, in which:

FIGS. 14 to 16 illustrate the mirror movement mechanism of the embodiment of FIG. 8.

DESCRIPTION OF PREFERRED EMBODIMENTS

Figure 1:
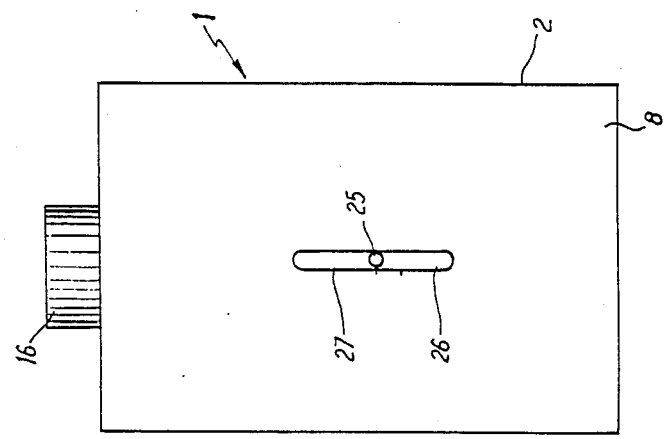
FIG. 1 is a plan view of a first embodiment of a navigation aid in accordance with the present invention.

Referring to FIG. 1, a navigation aid 1 for using in sailing vessels comprises a housing 2 having a mirror 3 movably mounted therein. The housing 2 is generally cuboid in form and comprises two side walls 4 and 5, front and rear walls 6 and 7 and a roof 8 and base 9.

The mirror 3 is mounted, at 45° to the central axis of the housing 2, on a carriage 10 which is located between two guide members 11 and 12 which are fixed to the base 9 of the housing 2.

The carriage 10 is moved, along the main axis of the housing 2, by the rotation of a rod 13 which is provided with a screw thread 14 at one of its end portions that engages a threaded opening (not shown) in the carriage 10. The opposite end portion of the rod 13 extends through an opening 15 in the rear wall 7 and is fixed to a knurled wheel 96 which an operator may rotate to move the carriage 10.

Figure 2:
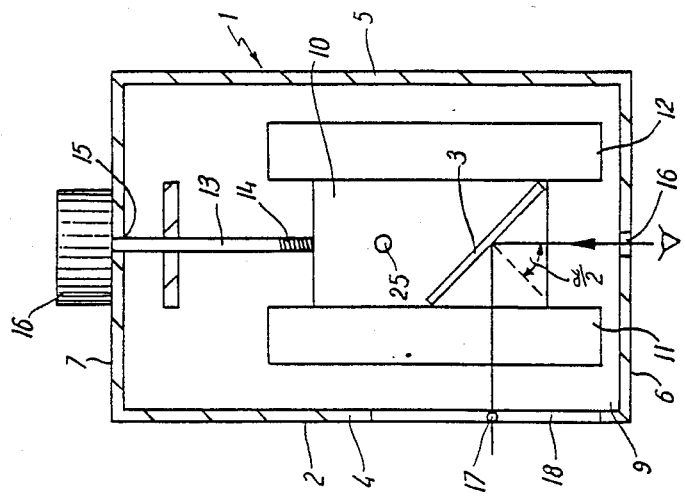
FIG. 2 is a sectional plan view of the navigation aid of FIG. 1.
Figure 5:
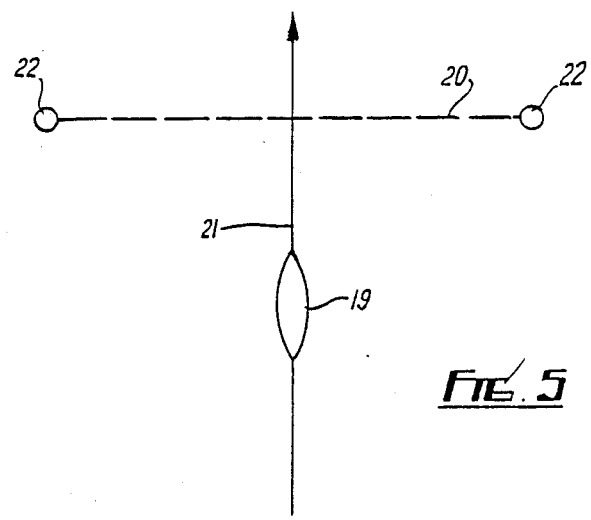
FIGS. 5 and 6 are diagrammatic plan views of situations where a navigation aid in accordance with the present invention may be used.

Now referring also to FIG. 5, if an operator wishes to know when, for example, a vessel 19 he is travelling on crosses a start/finish line 20 marked by buoys 22 which is, for example, at an angle $\alpha$ to the direction of travel 21 of the vessel 19 the operator sets the carriage 10 as is shown in FIG. 2. The operator then aligns the housing 2 with the main axis of the vessel 19 and looks through a viewing hole 16 in the front wall 6 of the housing 2. A sighting pin 17 mounted vertically in a window 18 in the side wall 4 of the housing 2 is viewed by the operator at an angle normal to the axes of the housing 2, and the vessel 19. When the vessel 19 crosses the start/finish line 20, the sighting pin 17 will be superimposed on the image of the marker buoy 22.

Figure 6:
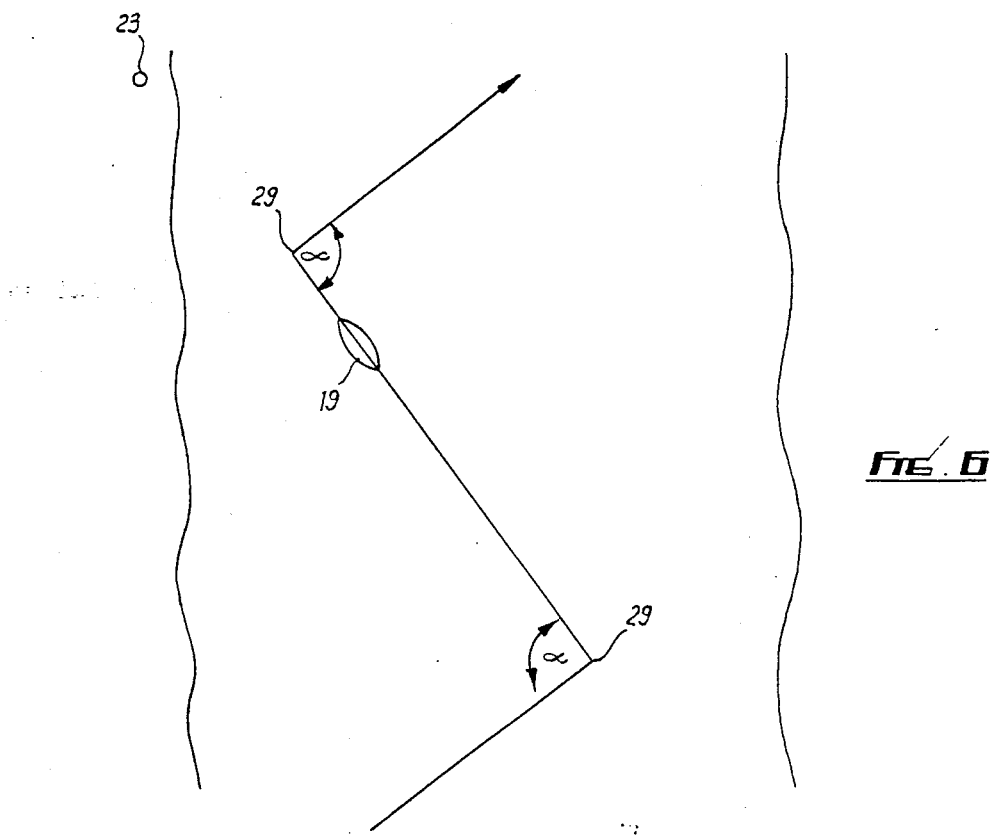

Now referring to FIG. 6, when the optimum course for a tacking vessel has been determined and set out on a chart, the aid 1 can be set to indicate, with reference to markers 23 of known position, when a point on the vessel's 19 course is reached so that the optimum position for the vessel 19 to, for example change tack, can be easily located while sailing.

If it has been calculated that the optimum tacking angle is $\alpha$ the carriage 10, and thus the mirror 3, are moved so that the angle between a line normal to the mirror 3 and the line of sight of the operator is $\alpha/2$. Thus, when the vessel reaches the optimum tacking point 29, an operator using the navigation aid 1 will see the sighting pin 17 superimposed on the image of the marker 23, which has been chosen as being on the new line of tack. At this point the operator will give the order to "go about" and the vessel 19 is truned to follow a new tack.

In a similar fashion the aid may be used for doubling the angle of on the bow navigation, and also for observing the approach of other vessels where the risk of collision may develop.

The setting of the aid 1 is indicated by a pin 25 which is visible through a window 26 in the roof 8 of the housing, a scale 27 being set out alongside the window 26.

To obtain a view from the opposite side of the vessel 19 the operator simply inverts the aid 1 such that the window 18 faces in the opposite direction.

Figure 3:
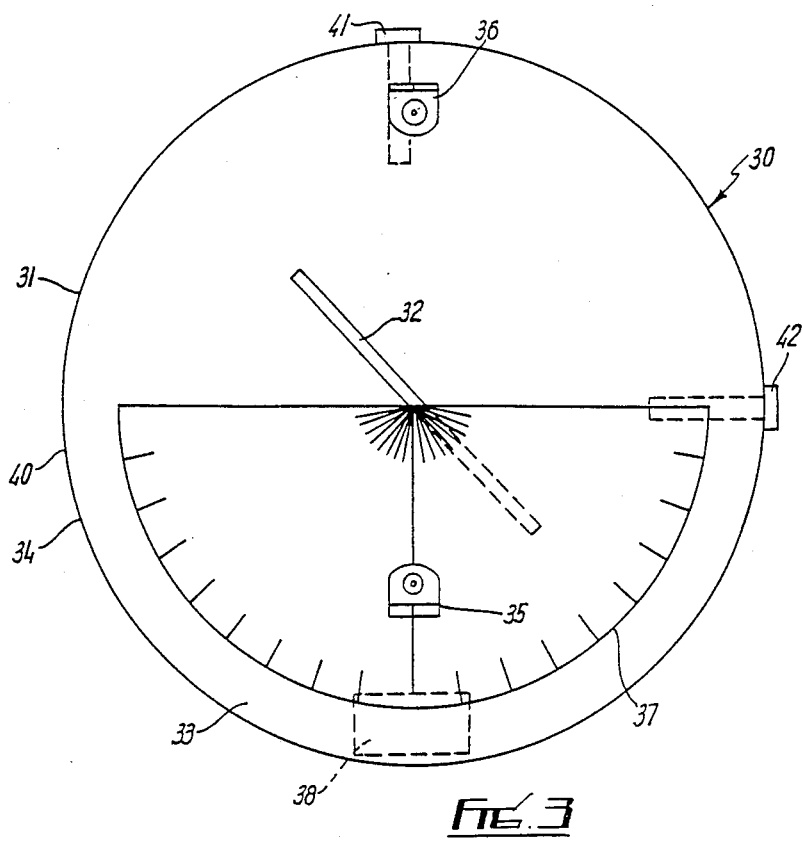
FIG. 3 is a plan view of a second embodiment of a navigation aid in accordance with the present invention.

Now referring to FIG. 3, a second embodiment of a navigation aid 30 comprises a housing 31 having a mirror 32 mounted therein.

The housing 31 of a translucent material such as perspex and consists of two parts 33 and 34. Both parts 33 and 34 are circular in plan view and are rotatable relative to one another.

The upper part 33 forms the top surface of the housing 31 and is provided with alignment sights 35 and 36, an angular scale 37, a viewing piece 38, and pin (not shown) which extends vertically down from the front alignment sight 36.

The lower part 34 comprises a base 39 and a cylindrical side wall 40. The mirror 32 is fixed and extends perpendicularly from the base 39. A sighting line (not shown) is etched on the mirror 32 along the central axis of the housing 31.

Two movable locating pins 41 and 42 are located in a circumferential slot in the side wall 40 and extend into the housing 31.

In FIG. 3, the aid 30 is shown in a setting to locate a remote marker perpendicular to the line of travel of a vessel. The parts 33 and 34 of the housing are rotated so that the line of view 45 through the viewing piece 38 is at 45° to the mirror 32.

The housing 31 is then aligned with the main longitudinal axis of the vessel by means of the alignment sights 35 and 36.

If an operator then looks through the viewing piece 38 the sighting line on the mirror 32 is superimposed upon any remote objects perpendicular to the vessel and thus the operator can discover when the vessel crosses, for example, a starting line.

By rotation of the two pieces 33 and 34 an operator may alter the view angle of the mirror 32. The pins 41 and 42 can be fixed in predetermined positions to act as stops for the pin which extends from the front alignment sight 36.

When following a "zig-zag" course of tacks as is shown in FIG. 6 the operator may rotate the parts 33 and 34 from one stop to the other when the vessel changes tack.

Figure 4:
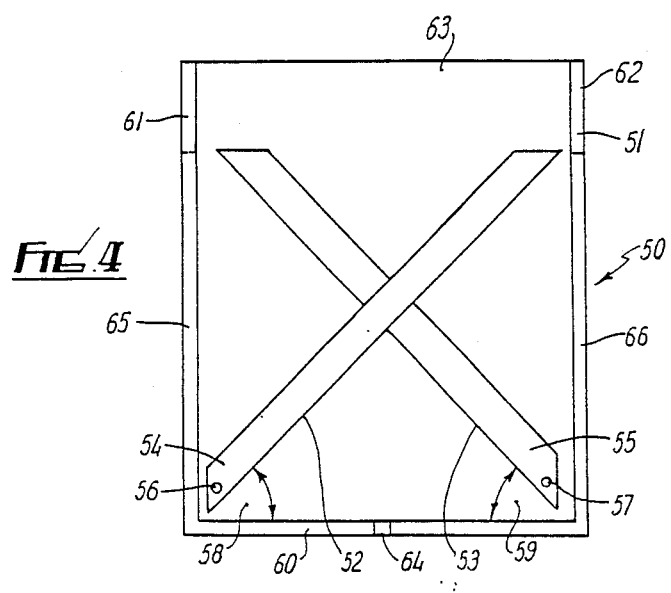
FIG. 4 is a plan view of a third embodiment of a navigation aid in accordance with the present invention.

Now referring to FIG. 4, a third embodiment of a navigation aid 50 comprises a housing 51 consisting of a front wall 60, two side walls 61 and 62 and a base 63 and having two mirrors 52 and 53 mounted therein. The mirrors 52 and 53 are mounted on support members 54 and 55 which are, in turn, rotatably mounted on pins 56 and 57 which extend from the base 63 of the housing 51. The support members 54 and 55 are mounted one above the other and are interconnected such that the angles 58 and 59 between the front wall 60 of the housing 51 and the mirrors 52 and 53 remain equal. Vertical sighting lines (not shown) are etched on the mirrors 52 and 53.

An operator views the mirrors 52 and 53 through a slot 64 in the front wall 60 of the housing 51. Windows 65 and 66 provided in the side walls 61 and 62 of the housing 51 allow the operator to view remote objects on both sides of the aid 50.

By rotating the support members 54 and 55 and thus the mirrors 52 and 53 through known angles the operator can determine the location of the vessel on a known course by similar means as with the second embodiment of the aid 30 as described above.

A futher embodiment of a navigational aid may be provided with interconnected rotatable prisms in place of mirrors. In this case the sighting lines are provided on the faces of the prisms.

Figure 7:
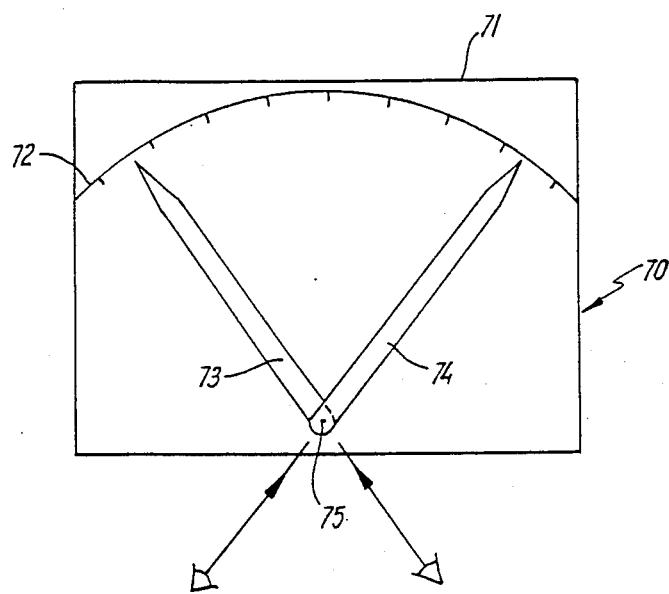
FIG. 7 is a plan view of a navigation aid.

Referring to FIG. 7, a simple navigation aid 70 comprises a base plate 71 the upper surface of which is provided with a graduated angular scale 72. Two pointers 73 and 74 are pivotally attached to the plate 71 at 75. An operator wishing to know the angle between the line of travel of a vessel and a remote object aligns the plate 71 with the vessel and views along the line of one of the pointers 73 or 74, reading the angle of the pointer 73 or 74 from the scale 72.

By presetting the pointers 73 and 74 to a known angle the aid 70 may be used to find the optimum tacking point on a vessel's course as described above.

FIGS. 8 to 16 show a preferred embodiment of a navigation aid 80 comprising a housing 81 having reflecting surfaces in the form of two mirrors 82 and 83 mounted therein. The mirrors 82 and 83 are movably mounted on a mechanism which is connected to an arm and rack and in the form of a member 84 having three pivotally connected sections which is connected to an arm and rack and pinion gear arrangement, 85 located near an end wall of the housing 81.

By rotating the pinion gear 85A an operator may alter the angle of the mirrors 82 and 83 with respect to the central axis of the housing 81 by altering the angles between the three pivotally connected sections of the elongate member 84. Thus the user my alter the view through the first and third apertures or windows 86 and 89 in the housing 81 which is obtained when the mirrors 82 and 83 are viewed through an opening or view port or aperture, in the end of housing 81.

The tacking angle of a particular vessel in particular wind condition is the maximum angle between tacks which allows the maximum forward motion of the vessel. Optimising the forward motion of the vessel, by changing tack at the appropriate time is essential in competition sailing. Once this optimum tacking angle is calculated the navigation aid is set such that the angle between a line drawn from the Marker 90 on the windows 86 and 89 to the mirrors 82 and 83 and out through the view port 88 is equal to the optimum tacking angle. Thus if the user aligns the tacking device with the direction of travel of the ship he can see objects on either side, of the ship which will lie in a line at the optimum tacking angle to the vessel direction when they are superimposed on the Marker 90 on the window 86 or 89.

Thus if the ship is to tack around a buoy for example then the user will view the buoy through the aid and give the order to tack just after the buoy has been superimposed on the Marker 90 and the ship will pass by the buoy as desired, at the optimum angle.

The marker 90 may be a sight line mounted on the base member 81 and visible on the reflected view as seen by the operation, through view port 88 or alternatively may be a mark drawn on the window 86 or 89.

Figure 8:
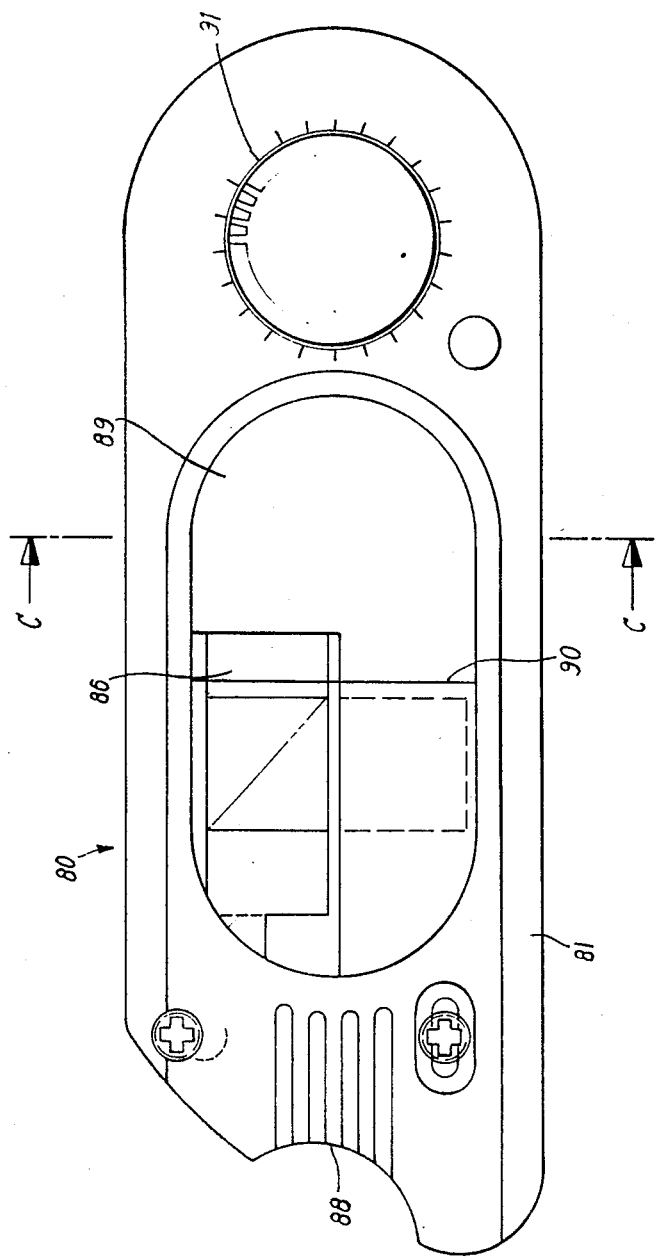
FIG. 8 is a side elevational view of a preferred embodiment of a navigation aid in accordance with the present invention.
Figure 9:
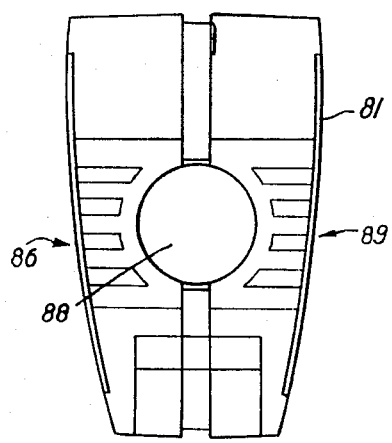
FIG. 9 is a front view of the navigation aid of FIG. 8.
Figure 10:
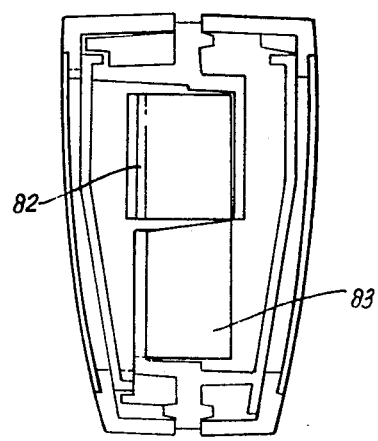
FIG. 10 is a section along the line C—C of FIG. 8.
Figure 11:
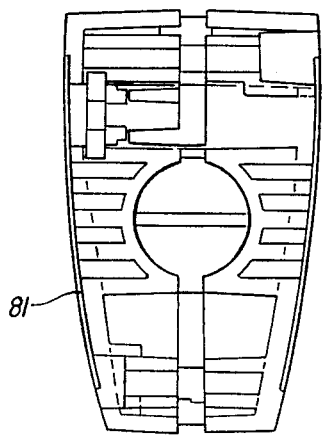
FIG. 11 is a section along the line B—B of FIG. 8.
Figure 12:
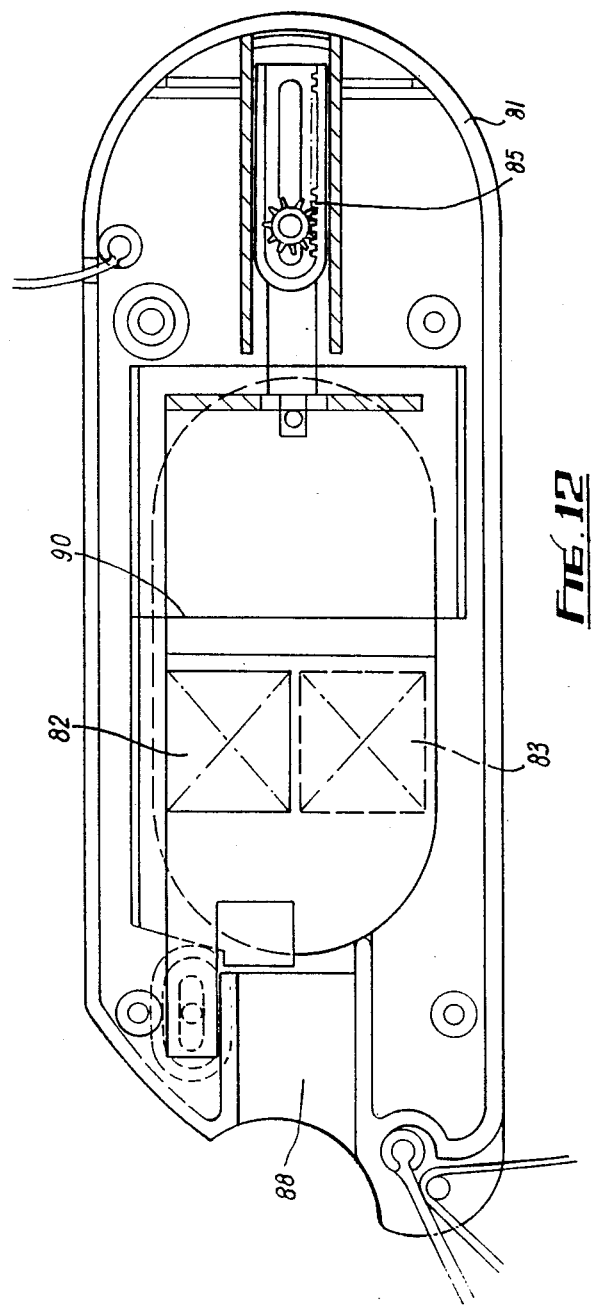
FIG. 12 is a side sectional view corresponding to FIG. 8.
Figure 13:
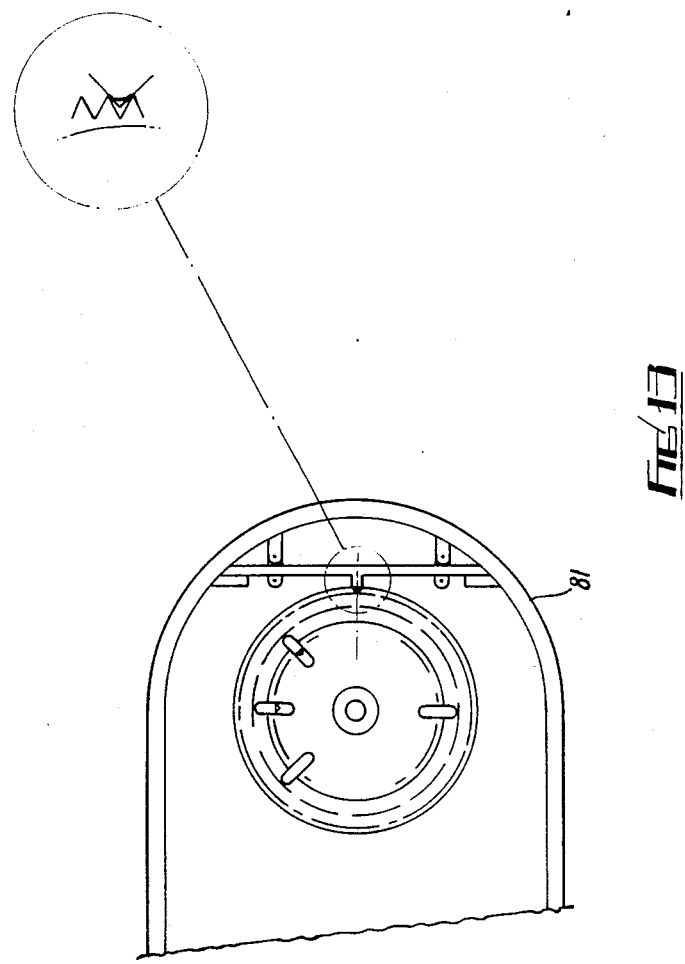
FIG. 13 is a detail of the adjustment means of the embodiment of FIG. 8.

The indicator means 91 is provided to show the tacking angle to which the navigation aid is set. The indicator means 91 being in the form of a scale on the means to control the angle to which the aid is set, as shown in FIG. 8.

Modifications and improvements may be made without departing from the scope of the invention. In a still further embodiment, for example, a thumb holder and a point for attaching the aid to a lanyard may be provided.

We claim:

1. A navigation aid for use in sailing vessels, the aid comprising a casing defined by at least one side wall, a first end wall and a second end wall spaced apart from said first end wall, the side wall having a first aperture and the end wall having a view port in the form of a second aperture, a reflective surface mounted on a movable mechanism, the mechanism comprising an elongate member having three pivotal connected sections, the sections being formed so as to provide a central section and two end sections, the central section of the member being formed so as to receive the reflective surface, one end of the member being affixed to the casing, near the first end wall of the casing and the opposite end of the member being affixed to an arm, near the second end wall of the casing, such that movement of the arm pivots the sections with respect to each other and thus alters the angle of the central section with respect to the central axis of the casing, thereby enabling adjustment of the position of the reflective surface, such that and object located within a range of angles to the central axis of the casing can be viewed due to light from the object being transmitted by the first aperture and reflected by the reflective surface at an angle of reflectance which will direct the light through the view port, the angle of reflectance being alterable by the user altering the positioning of the reflective surface and thus altering the angle between the reflective surface and the central axis of the casing.

2. A navigation aid as claimed in claim 1, wherein a third aperture is provided in the casing, said third aperture being located in a side wall opposite the first aperture, the navigation aid further including a second movable mechanism which includes a second reflective surface positioned so as to reflect light transmitted by the third aperture in the direction of the view port in the same manner as light transmitted by the first aperture is reflected by the first movable mechanism in the direction of the view port.

3. A navigation aid as claimed in claim 1, wherein the reflective surface is a mirror.

4. A navigation aid as claimed in claim 1, wherein the reflective surface is a prism.

5. A navigation aid as claimed in claim 1, wherein the first aperture includes a static marker which can be viewed through the view port over a range of angles such that distant objects can be viewed in alignment with the static marker, at any one of a plurality of predetermined angles of the reflective surface to the central axis of the casing such that the point where the distant object is at the predetermined angle to the central axis of the casing can be determined.

6. A navigation aid as claimed in claim 5 wherein an indicator means is provided, to indicate the angle between line drawn from the marker positioned on the first and third apertures to the reflective surface and the central axis of the casing such that light which is incident along that line will be reflected through the view port at the pre-set angle due to the positioning of the reflecting surface with respect to the central axis of the casing.

7. A navigation aid as claimed in claim 1, wherein external static alignment means are provided on the casing, along the central axis of the casing to enable the user to align the aid, and thus his line of sight in a specific direction, such as the heading of a vessel on which he is travelling, such that all angles measured with respect to the central axis of the casing are equal to the angles measured with respect to the heading of the vessel.

* * * * *